(12) United States Patent
Yamasaki et al.

(10) Patent No.: US 12,109,935 B2
(45) Date of Patent: Oct. 8, 2024

(54) VEHICLE HAVING ROAD-SURFACE RENDERING FUNCTION

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/430,487

(22) Filed: Feb. 1, 2024

(65) Prior Publication Data
US 2024/0270156 A1 Aug. 15, 2024

(30) Foreign Application Priority Data

Feb. 14, 2023 (JP) .................................. 2023-021176

(51) Int. Cl.
| | |
|---|---|
| *G08G 1/005* | (2006.01) |
| *B60Q 1/14* | (2006.01) |
| *B60Q 1/50* | (2006.01) |
| *G06V 10/60* | (2022.01) |
| *G06V 20/56* | (2022.01) |

(52) U.S. Cl.
CPC ............... *B60Q 1/143* (2013.01); *B60Q 1/50* (2013.01); *G06V 10/60* (2022.01); *G06V 20/588* (2022.01); *B60Q 2400/50* (2013.01)

(58) Field of Classification Search
CPC ...... B60Q 1/143; B60Q 1/50; B60Q 2400/50; G06V 10/60; G06V 20/588; B60W 2510/00; B60W 2520/00; B60W 10/00; B60W 20/00; B60W 30/00; B60W 40/00; B60W 50/00
See application file for complete search history.

(56) References Cited

U.S. PATENT DOCUMENTS 10,134,283 B2  11/2018  Masuda et al.

FOREIGN PATENT DOCUMENTS

| | | |
|---|---|---|
| JP | 2015-164828 A | 9/2015 |
| JP | 2016-055691 A | 4/2016 |
| JP | 2020-111284 A | 7/2020 |

*Primary Examiner* — Elmito Breval
(74) *Attorney, Agent, or Firm* — Rimon P.C.

(57) ABSTRACT

A vehicle having a road-surface rendering function includes a light projection member, a detection device, and a control unit. The light projection member performs light projection for road-surface rendering in the traveling vehicle and renders a road-surface rendered image onto a road surface surrounding the traveling vehicle. The detection device performs detection of a detection range larger than a light projection range in which the road-surface rendered image is rendered by the light projection member. The control unit controls the light projection for the road-surface rendering by the light projection member in accordance with the detection. The control unit determines whether the road-surface rendering is adequate at least in an outer area of the road surface located outside the light projection range with respect the detection range, and suppresses the light projection when the road-surface rendered image passes a road-surface area determined as being inadequate for the road-surface rendering.

13 Claims, 8 Drawing Sheets

VEHICLE HAVING ROAD-SURFACE RENDERING FUNCTION

CROSS-REFERENCE TO RELATED APPLICATIONS

The present application claims priority from Japanese Patent Application No. 2023-021176 filed on Feb. 14, 2023, the entire contents of which are hereby incorporated by reference.

BACKGROUND

The disclosure relates to vehicles having road-surface rendering functions.

Japanese Unexamined Patent Application Publication Nos. 2016-055691, 2020-111284, and 2015-164828 disclose projecting light from a vehicle to render various patterns on a road surface on which the vehicle is traveling.

By rendering any of such patterns on the road surface, the vehicle can provide, via the road surface, travel-related information about the vehicle to the driver who drives the vehicle.

SUMMARY

An aspect of the disclosure provides a vehicle having a road-surface rendering function. The vehicle includes a light projection member, a detection device, and a control unit. The light projection member is configured to perform light projection for road-surface rendering in the vehicle that is traveling and render a road-surface rendered image onto a road surface surrounding the vehicle that is traveling. The detection device is configured to perform detection of a detection range larger than a light projection range in which the road-surface rendered image is rendered by the light projection member. The control unit is configured to control the light projection for the road-surface rendering by the light projection member in accordance with the detection by the detection device. The control unit is configured to determine whether the road-surface rendering is adequate at least in an outer area of the road surface located outside the light projection range with respect the detection range of the detection device, and suppress the light projection for the road-surface rendered image from the light projection member when the road-surface rendered image passes a road-surface area determined as being inadequate for the road-surface rendering.

An aspect of the disclosure provides a vehicle having a road-surface rendering function. The vehicle includes a light projection member and circuitry. The light projection member includes a light source and is configured to perform light projection for road-surface rendering in the vehicle that is traveling and render a road-surface rendered image onto a road surface surrounding the vehicle that is traveling. The circuitry is configured to perform detection of a detection range larger than a light projection range in which the road-surface rendered image is rendered by the light projection member. The circuitry is configured to control the light projection for the road-surface rendering by the light projection member in accordance with the detection. The circuitry is configured to determine whether the road-surface rendering is adequate at least in an outer area of the road surface located outside the light projection range with respect the detection range. The circuitry is configured to suppress the light projection for the road-surface rendered image from the light projection member when the road-surface rendered image passes a road-surface area determined as being inadequate for the road-surface rendering.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

A road-surface rendered image rendered on the road surface as a result of projecting light from the vehicle is not limited to an image that can be visually recognized easily by the driver who drives the vehicle.

For example, when the road surface is to totally reflect light, the light projected from the vehicle for the road-surface rendering is mostly reflected toward, for example, an oncoming vehicle, thus resulting in a reduced quantity of light returning toward the vehicle that has projected the light. In this case, for the driver who drives the vehicle that has projected the light, the road-surface rendered image may possibly be a pale image that is difficult to visually recognize.

On the other hand, for example, when the road surface is to totally reflect light to cause intense regular reflection to occur, there is a concern that a driver who drives an oncoming vehicle or a pedestrian walking toward the vehicle may be irradiated with intense light via the road surface. Such intense reflection may also possibly occur partially in the road-surface rendered image.

It is desirable that the road-surface rendering from the vehicle be improved.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. First Embodiment FIG. 1 illustrates an example of a traveling state of an vehicle 1 such as an automobile according to a first embodiment of the disclosure.

Figure 1:
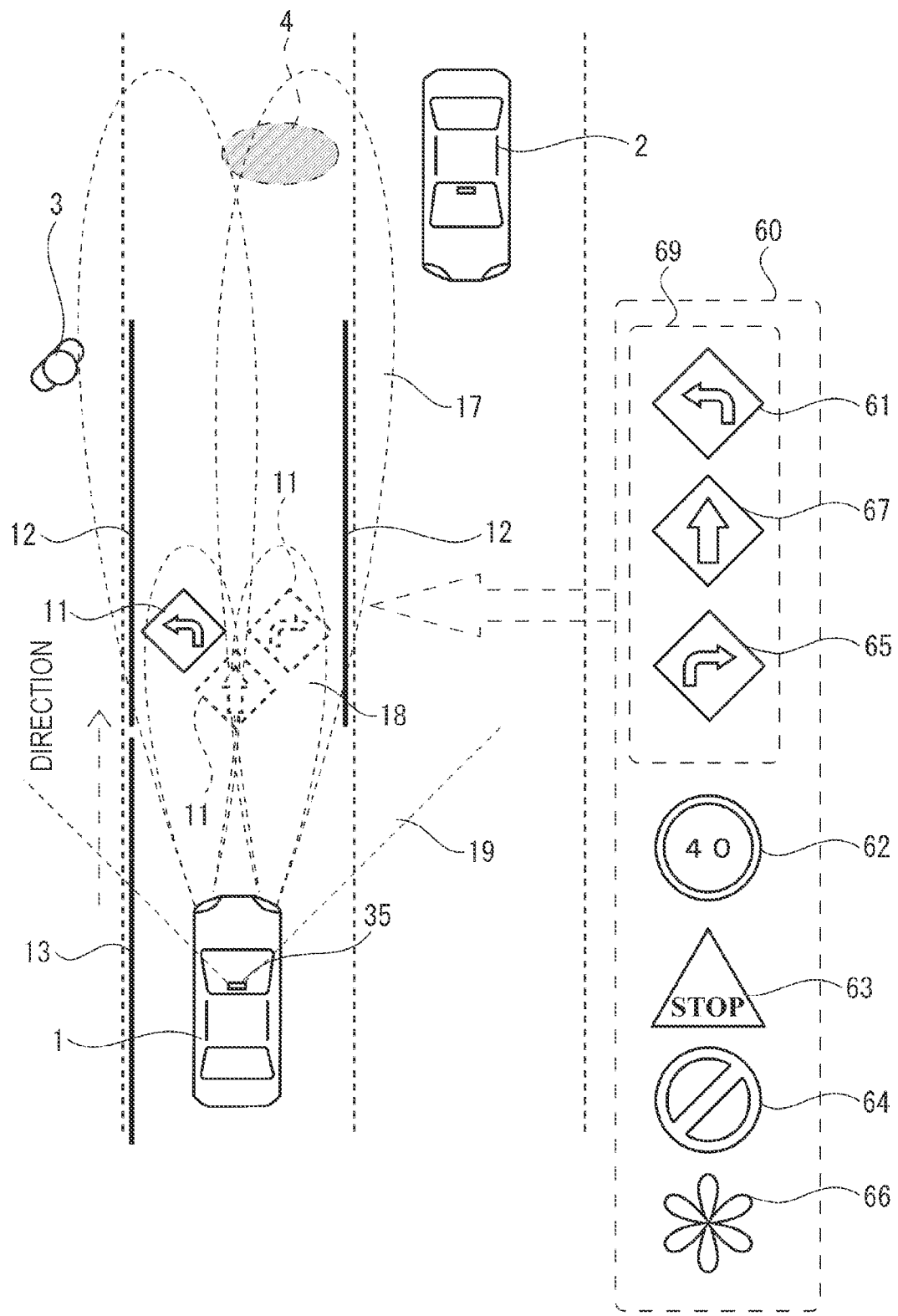
FIG. 1 illustrates an example of a traveling state of a vehicle according to an embodiment of the disclosure.

FIG. 1 illustrates the vehicle 1 traveling on one of lanes of a two-lane road. The automobile is an example of the vehicle 1. Other examples of the vehicle 1 include a bus, a truck, a motorcycle, and a personal mobility device. The vehicle 1 may be capable traveling based on autonomous driving including driving assistance.

An oncoming vehicle 2 is traveling on the opposite lane of the road. A pedestrian 3 is present on a road shoulder.

In such a travel environment, a driver who drives the vehicle 1 controls the vehicle 1 without causing the vehicle 1 to deviate from the road lane while paying attention to what is ahead in the traveling direction of the vehicle 1.

When the travel environment is dark, the vehicle 1 turns on the headlamp. In FIG. 1, an irradiation range 18 of the headlamp in a low beam mode and an irradiation range 17 of the headlamp in a high beam mode are indicated with dashed lines. A vehicle-exterior camera 35, to be described later, is provided at the front of a vehicle cabin of the vehicle 1. The vehicle-exterior camera 35 captures an image ahead of the vehicle 1 with a wide angle of field entirely covering the irradiation range 18 of the headlamp in the low beam mode and the irradiation range 17 of the headlamp in the high beam mode.

With regard to such an vehicle 1, rendering of patterns by radiating visible light onto the road surface from the vehicle 1 is being researched and developed.

For example, FIG. 1 illustrates a road-surface rendered image 11 based on a simple pattern mimicking a road sign, lane boundary lines 12 extending along the left and right sides of the lane of the vehicle 1, and a road-shoulder boundary line 13 rendered alongside the road shoulder of the vehicle 1. The road-surface rendered image 11 is rendered in front of the vehicle 1 in the traveling direction for the driver who drives the vehicle 1. The lane boundary lines 12 and the road-shoulder boundary line 13 are rendered toward the pedestrian 3 on the road shoulder and toward the oncoming vehicle 2.

The right side of FIG. 1 illustrates multiple light projection patterns 60 each serving as a basis for the road-surface rendered image 11. In this case, a light projection pattern 61 for a left-turn indication, a light projection pattern 67 for a go-straight indication, a light projection pattern 65 for a right-turn indication, a light projection pattern 62 for a speed-limit indication, a light projection pattern 63 for indicating a stop position, a light projection pattern 64 for a no-crossing indication, and a histogram-based light projection pattern 66 for snowy or frozen road warning are illustrated. The vehicle 1 may select any of the multiple light projection patterns 60 in accordance with the traveling state and the travel environment and may project light corresponding to the light projection pattern.

By rendering a pattern, such as the road-surface rendered image 11, on the road surface, the vehicle 1 can provide travel-related information about the vehicle 1 to, for example, the driver via the road surface.

However, the road-surface rendered image 11 rendered on the road surface as a result of projecting light from the vehicle 1 in this manner is not always visually recognizable easily by, for example, the driver who drives the vehicle 1.

For example, when the road surface is to totally reflect light, the light projected from the vehicle 1 for the road-surface rendering is mostly reflected toward, for example, an oncoming vehicle, thus resulting in a reduced quantity of light returning toward the vehicle 1 that has projected the light. In this case, for the driver who drives the vehicle 1 that has projected the light, the road-surface rendered image 11 may possibly be a pale image that is difficult to visually recognize.

On the other hand, if the road surface is to totally reflect light to cause, for example, intense regular reflection to occur, the driver who drives the oncoming vehicle 2 and the pedestrian 3 walking toward the vehicle 1 may possibly be irradiated with intense light via the road surface. There is a possibility that such intense reflection may occur partially in the road-surface rendered image 11.

Accordingly, it is desirable that the road-surface rendering from the vehicle 1 be improved.

Figure 2:
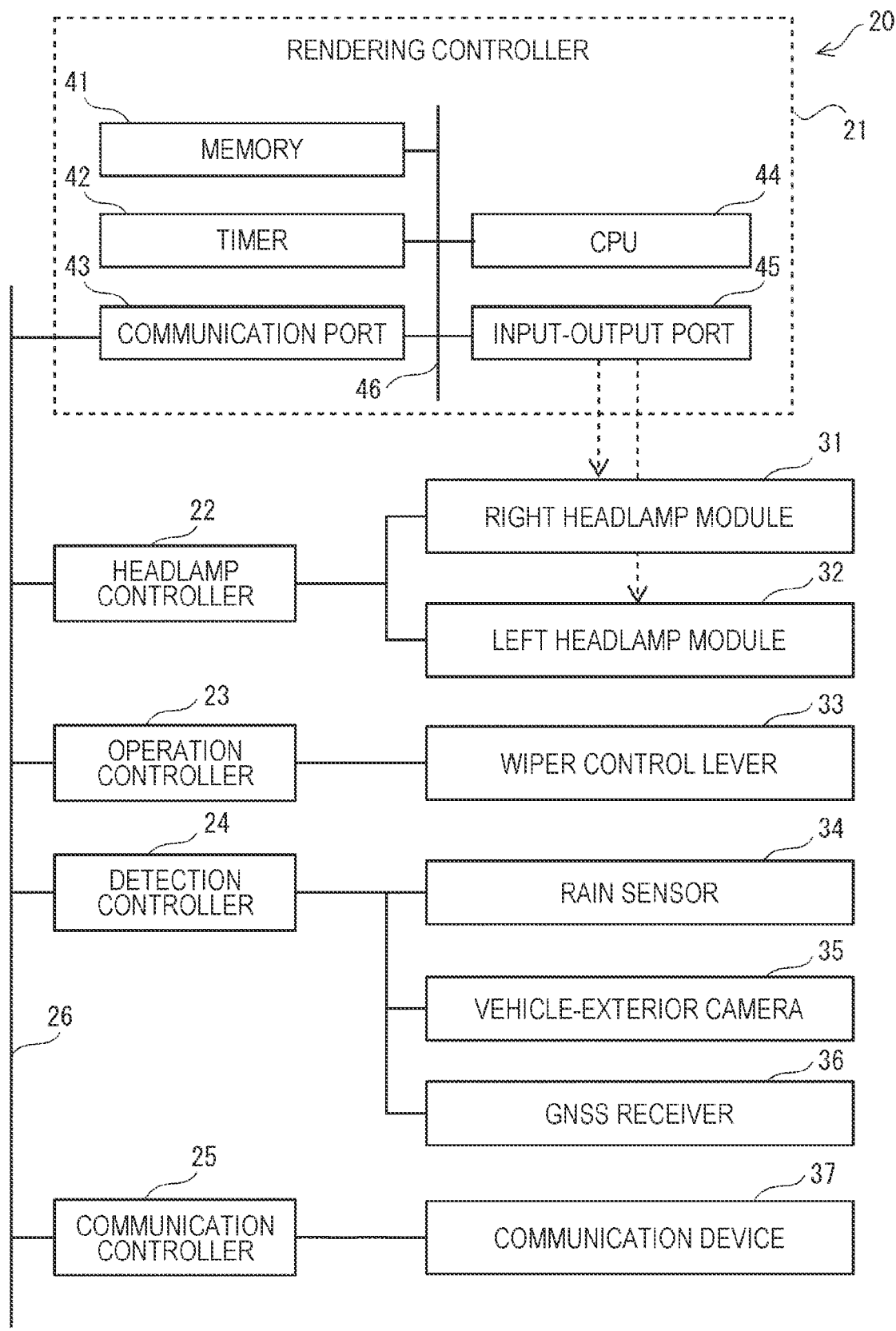
FIG. 2 illustrates a control system provided in the vehicle in FIG. 1.

FIG. 2 illustrates a control system 20 provided in the vehicle 1 in FIG. 1.

The control system 20 of the vehicle 1 in FIG. 2 has multiple controllers and a vehicle network 26 coupled thereto.

The vehicle network 26 may be a wired communication network compliant with, for example, a controller area network (CAN) or a local interconnect network (LIN) for the vehicle 1. The vehicle network 26 may be a communication network, such as a local area network (LAN), or a combination of the above. The vehicle network 26 may partially include a wireless communication network. The aforementioned devices coupled to the vehicle network 26 can exchange information with one another via the vehicle network 26.

FIG. 2 also illustrates a rendering controller 21, a headlamp controller 22, an operation controller 23, a detection controller 24, and a communication controller 25 as examples of the multiple controllers. The vehicle network 26 may also be coupled to controllers other than the above, such as a travel controller and an air-conditioning controller. Each controller illustrated in FIG. 2 may be split into multiple units that are coupled to the vehicle network 26.

The headlamp controller 22 is coupled to a right headlamp module 31 and a left headlamp module 32 that are provided at the front end of the vehicle 1. The right headlamp module 31 and the left headlamp module 32 are headlamp members that project light forward of the vehicle 1.

As will be described later, the right headlamp module 31 and the left headlamp module 32 according to this embodiment each have a light projection module 53 for road-surface rendering. In this embodiment, the light projection module 53 of the right headlamp module 31 and the light projection module 53 of the left headlamp module 32 serve as light projection members capable of projecting light for road-surface rendering in the traveling vehicle 1 and rendering the road-surface rendered image 11 onto the road surface surrounding the traveling vehicle 1. That is, the light projection member (s) may include a light source.

The headlamp controller 22 controls the on mode of the right headlamp module 31 and the on mode of the left headlamp module 32 in accordance with information acquired via the vehicle network 26. Such information includes operational information about a lamp control lever (not illustrated) and information about a detection value of a light quantity sensor for an automatic light (not illustrated). Normally, the lamp control lever can be set in any of operational modes including a low beam mode, a high beam mode, and an off mode.

The headlamp controller 22 may output the information about the on mode of the right headlamp module 31 and the on mode of the left headlamp module 32 to another controller via the vehicle network 26.

The operation controller 23 is coupled to other operational members to be operated by an occupant, such as the driver. FIG. 2 illustrates a wiper control lever 33 as an operational member. The wiper control lever 33 is used for controlling the operation of a wiper device (not illustrated) for wiping the outer surface of the windshield of the vehicle 1. Normally, the wiper control lever 33 can be set in any of operational modes including an intermittent driving mode, a continuous driving mode, a high-speed continuous driving mode, and a stop mode.

The operation controller 23 may output the information about the operational modes of the various operational members, such as the wiper control lever 33, to another controller via the vehicle network 26.

The detection controller 24 is coupled to various detection members for detecting, for example, the traveling state and the travel environment of the vehicle 1. FIG. 2 illustrates a rain sensor 34, a vehicle-exterior camera 35, and a global navigation satellite system (GNSS) receiver 36 as the detection members.

The detection controller 24 may output, for example, detection information of the rain sensor 34 to another controller via the vehicle network 26.

The rain sensor 34 is provided on the outer surface of the windshield of the vehicle 1 and can detect rain and the amount of rainfall based on a change in an electrified state according to wetness caused by raindrops on the rain sensor 34.

As illustrated in FIG. 1, the vehicle-exterior camera 35 is provided facing forward in a vehicle cabin located within the windshield of the vehicle 1. The vehicle-exterior camera 35 can capture an image forward of the vehicle 1 in the traveling direction thereof. The vehicle-exterior camera 35 may include multiple vehicle-exterior cameras provided in the vehicle 1. The multiple vehicle-exterior cameras 35 may capture images of the environment surrounding the vehicle 1 in a split fashion. Alternatively, the vehicle-exterior camera 35 may be a 360° camera or a stereo camera.

The captured image obtained by the vehicle-exterior camera 35 may include, as a detection image, an image rendered on the road surface in accordance with light projection.

In addition to the vehicle-exterior camera 35, other devices that detect the environment surrounding the vehicle 1 include a Lidar and a laser. Similar to the captured image obtained by the vehicle-exterior camera 35, detection information obtained by the Lidar and the laser can be used as information about the environment surrounding the vehicle 1.

The vehicle-exterior camera 35, the Lidar, and the laser provided in the vehicle 1 may serve as detection devices capable of detecting the road surface onto which the road-surface rendered image 11 is projected.

The vehicle-exterior camera 35, the Lidar, and the laser are capable of detecting the road surface serving as a detection range larger than a light projection range of the road surface onto which the road-surface rendered image 11 is projected.

The GNSS receiver 36 receives radio waves from multiple GNSS satellites and detects positional information and time information about the vehicle 1 provided with the GNSS receiver 36.

The communication controller 25 is coupled to a communication device 37. The communication device 37 exchanges information with a server via, for example, a base station (not illustrated). The base station may be, for example, a 5G base station, an advanced driver-assistance system (ADAS) base station, or an intelligent transport system (ITS) base station. A 5G base station may be capable of implementing a server function. The communication device 37 may directly communicate with, for example, another vehicle 1 by vehicle-to-x (V2X) communication.

The communication controller 25 may transmit information acquired from the vehicle network 26 from the communication device 37 to the base station or the server, or may output information received by the communication device 37 from the base station or the server to the vehicle network 26.

The rendering controller 21 has a memory 41, a timer 42, a communication port 43, an input-output port 45, a central processing unit (CPU) 44, and an internal bus 46 coupled to these units. Each controller provided in the control system 20 may basically have the same structure as the rendering controller 21.

The input-output port 45 is coupled to the right headlamp module 31 and the left headlamp module 32.

The communication port 43 is coupled to the vehicle network 26. The communication port 43 acquires information from the vehicle network 26 and outputs information output by the rendering controller 21 to the vehicle network 26.

The timer 42 measures a time period or a time point. The time point measured by the timer 42 may be corrected in accordance with a time point obtained by the GNSS receiver 36.

The memory 41 may include, for example, a semiconductor memory, a hard disk drive (HDD), and a random access memory (RAM). The HDD is a nonvolatile memory. The RAM is a volatile memory. The memory 41 stores, as data, a program to be executed by the CPU 44 and various kinds of information to be used during the execution of the program. For example, the memory 41 stores data of the multiple light projection patterns 60 illustrated in FIG. 1.

The CPU 44 loads and executes the program stored in the memory 41. Accordingly, the CPU 44 serves as a control unit of the rendering controller 21. In this embodiment, the CPU 44 serves as a control unit that controls the light projection for the road-surface rendering by the light projection members 53.

The CPU 44 serving as a control unit controls the operation of the rendering controller 21. Furthermore, the CPU 44 serving as a control unit outputs signals to the right headlamp module 31 and the left headlamp module 32 via the communication port 43. Accordingly, the CPU 44 serving as a control unit controls the light projection modules 53 for road-surface rendering provided in the right headlamp module 31 and the left headlamp module 32. The right headlamp module 31 and the left headlamp module 32 emit light based on a light projection pattern for road-surface rendering. For example, as illustrated in FIG. 1, the road-surface rendered image 11 corresponding to the light projection pattern may be rendered on the road surface.

The CPU 44 serving as a control unit can control the light projection for the road-surface rendering by the light projection members 53 in accordance with the detection (captured image) by the vehicle-exterior camera 35 serving as a detection device.

Figure 3:
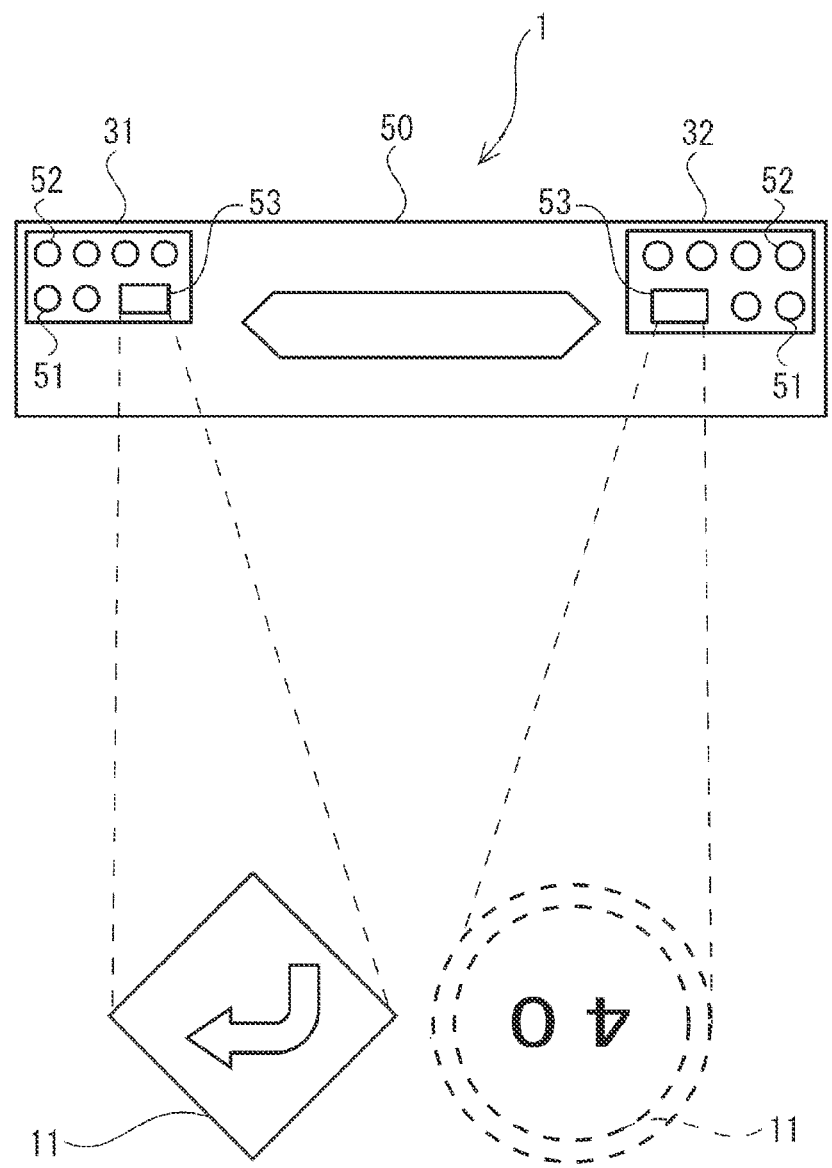
FIG. 3 schematically illustrates the structure and the disposition of a right headlamp module and a left headlamp module at the front end of the vehicle in FIG. 1.

FIG. 3 schematically illustrates the structure and the disposition of the right headlamp module 31 and the left headlamp module 32 at the front end of the vehicle 1 in FIG. 1.

FIG. 3 illustrates the front end of the vehicle 1.

The right end at the front end of the vehicle 1 is provided with the right headlamp module 31. The right headlamp module 31 has multiple low-beam light-emitting diodes (LEDs) 51, multiple high-beam LEDs 52, and a micro-electro-mechanical system (MEMS) light projection module 53.

The left end at the front end of the vehicle 1 is provided with the left headlamp module 32. The left headlamp module 32 has multiple low-beam LEDs 51, multiple high-beam LEDs 52, and a MEMS light projection module 53.

The light projection modules 53 may alternatively be, for example, digital micro-mirror device (DMD) light projection modules.

For example, each MEMS light projection module 53 may be configured to project light by reflecting three primary colors of light by using a MEMS element. The reflection mode of the MEMS element may be controlled in accordance with an image signal.

The right headlamp module 31 or the left headlamp module 32 may be capable of rendering an image other than that of the MEMS light projection module 53 on the road surface.

Each MEMS light projection module 53 may be capable of projecting light within the irradiation range of all of the multiple low-beam LEDs 51 and the multiple high-beam LEDs 52, as well as projecting light outside the irradiation range. The rendering pattern for the no-crossing indication for the pedestrian 3 in FIG. 1 is partially outside the irradiation range of all of the multiple low-beam LEDs 51 and the multiple high-beam LEDs 52.

In FIG. 3, the MEMS light projection module 53 of the right headlamp module 31 projects light, so that a road-surface rendered image 11 for a right-turn indication corresponding to the right-turn-indication light projection pattern 65 is rendered on the road surface.

Furthermore, the MEMS light projection module 53 of the left headlamp module 32 projects light, so that a road-surface rendered image 11 for a speed limit indication corresponding to the speed-limit light projection pattern 62 is rendered on the road surface.

In this case, a road-surface area where the road-surface rendered image 11 for the right-turn indication and the road-surface rendered image 11 for the speed limit indication are rendered serves as a light projection range.

The MEMS light projection module 53 of the right headlamp module 31 and the MEMS light projection module 53 of the left headlamp module 32 may operate in cooperation with each other to render multiple large road-surface rendered images 11 on the road surface.

The CPU 44 serving as a control unit controls the MEMS light projection module 53 of the right headlamp module 31 and the MEMS light projection module 53 of the left headlamp module 32 in accordance with light projection patterns, so as to be capable of rendering multiple road-surface rendered images 11 corresponding to the multiple light projection patterns on the road surface.

With regard to multiple light projection patterns that are not to be rendered simultaneously, the CPU 44 serving as a control unit may render them in the same road-surface area, or may render them in individual road-surface areas, as illustrated in FIG. 1. In one example, as illustrated in FIG. 1, it is conceivable that the road-surface rendered image 11 for the right-turn indication, the road-surface rendered image 11 for the go-straight indication, and the road-surface rendered image 11 for the left-turn indication can be ascertained more readily by the driver by positionally displacing the road-surface areas to be rendered in accordance with the respective directions.

Accordingly, the MEMS light projection module 53 of the right headlamp module 31 and the MEMS light projection module 53 of the left headlamp module 32 can serve as light projection members that project the road-surface rendered images 11 in accordance with the light projection patterns.

As illustrated in FIG. 1, the MEMS light projection module 53 of the right headlamp module 31 may project light for road-surface rendering such as to exclude the front end of the high-beam light projection range on the road surface by the right headlamp module 31.

Moreover, as illustrated in FIG. 1, the MEMS light projection module 53 of the left headlamp module 32 may project light for road-surface rendering such as to exclude the front end of the high-beam light projection range on the road surface by the left headlamp module 32.

Figure 4:
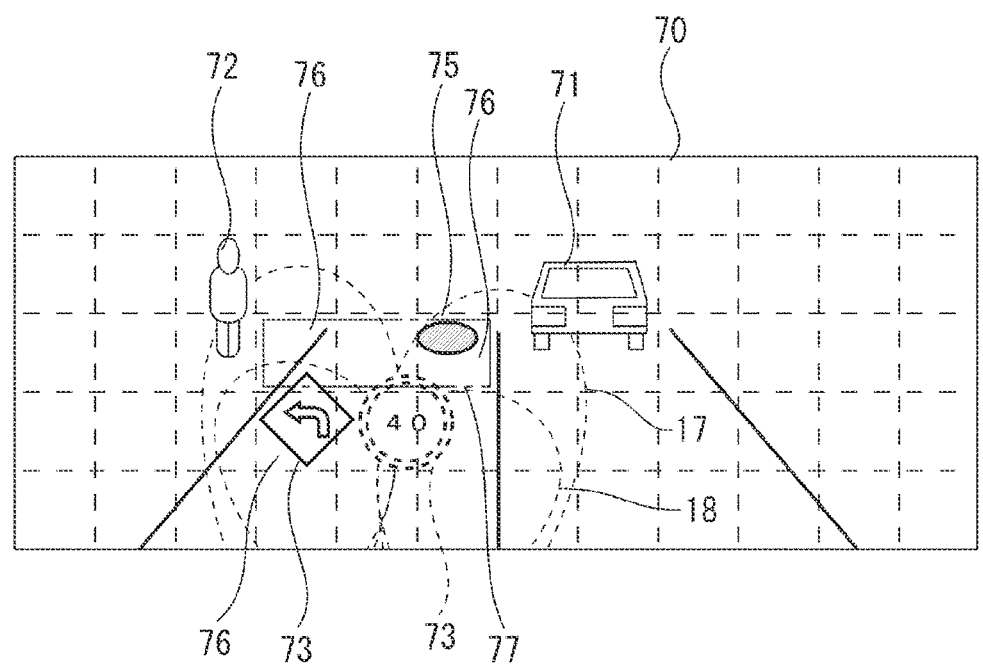
FIG. 4 illustrates a captured image obtained by a vehicle-exterior camera in FIG. 2.

FIG. 4 illustrates a captured image 70 obtained by the vehicle-exterior camera 35 in FIG. 2.

The captured image 70 in FIG. 4 is captured by the vehicle-exterior camera 35 of the vehicle 1 in the traveling state in FIG. 1.

Therefore, the captured image 70 in FIG. 4 includes an image 71 of the oncoming vehicle 2, an image 72 of the pedestrian 3, multiple detection images 73 corresponding to the multiple road-surface rendered images 11, and an image 75 of the puddle 4 on the road surface, together with the road on which the vehicle 1 is traveling. With regard to the image 75 of the puddle 4 on the road surface, even when light is projected in the high beam mode, the light is mostly reflected toward, for example, the oncoming vehicle 2, so that the quantity of light returning toward the vehicle 1 that has projected the light decreases. An area where intense reflection occurs toward, for example, the oncoming vehicle 2 in this manner has lower brightness and is thus darker than other road-surface areas.

The vehicle-exterior camera 35 detects, as a detection range, a range larger than a light projection range (i.e., a road-surface area where multiple road-surface rendered images 11 are rendered) where the road-surface rendered images 11 are rendered by the light projection members 53.

The detection range of the vehicle-exterior camera 35 is wide at least widens in a forward portion in the traveling direction of the vehicle 1, as compared with the light projection range of the light projection members 53.

In the captured image 70, the image 75 of the puddle 4 on the road surface is located at the upper side of the light projection range. In this case, when the vehicle 1 travels forward, the light projection range that moves forward with the traveling vehicle 1 may possibly overlap the image 75 of the puddle 4 on the road surface in the captured image 70. In other words, when the vehicle 1 travels forward, the light projection range in FIG. 4 may conceivably move, in the future, to a prediction range 77 located higher than that in FIG. 4 in the captured image 70.

In FIG. 4, the captured image 70 is split into multiple segments 76 that are disposed in a grid-like pattern. Each segment 76 is a unit used for determining whether the light projection range and a low-brightness road-surface area, such as the puddle 4, overlap each other in the captured image 70.

Figure 5:
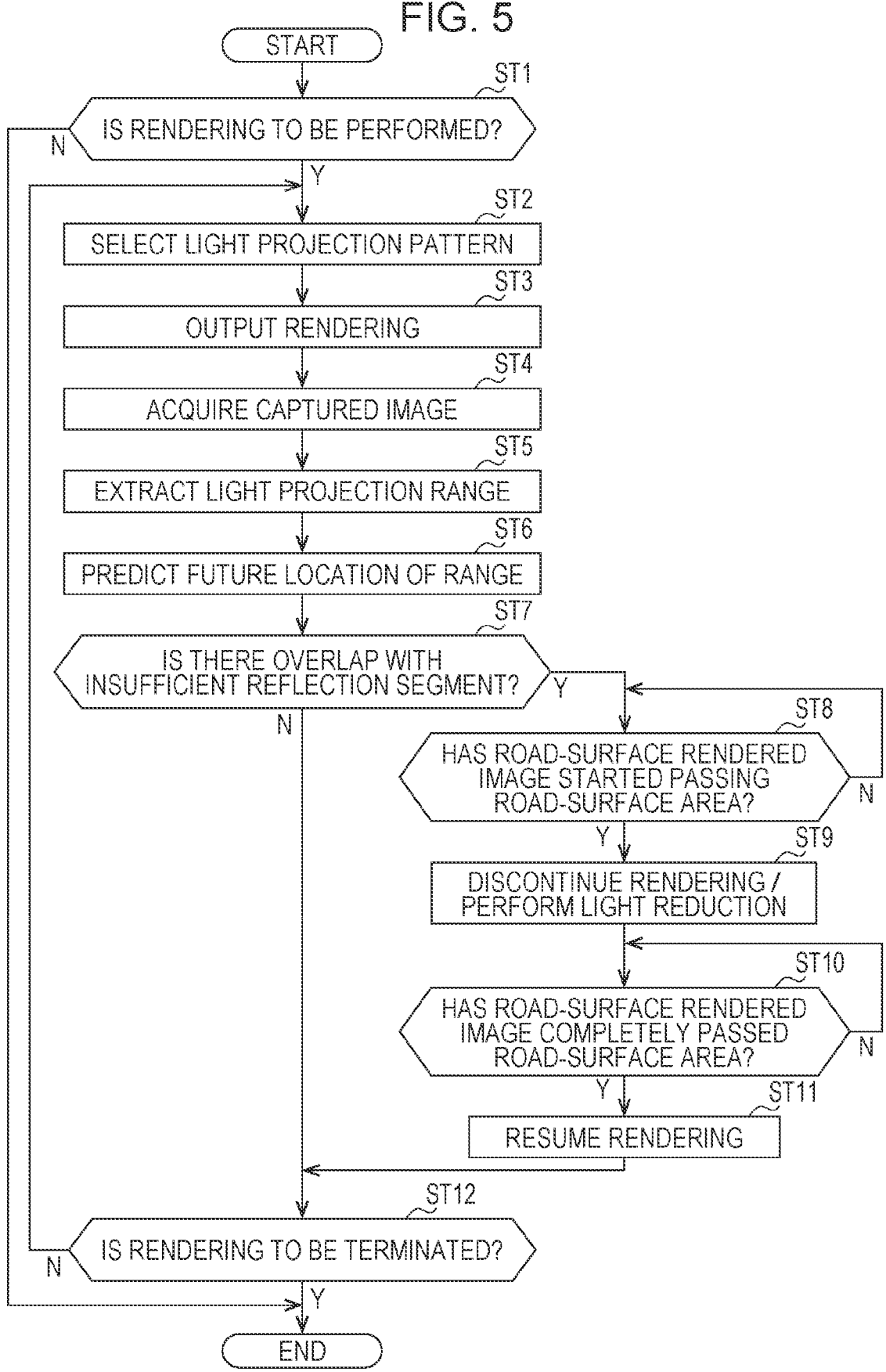
FIG. 5 is a flowchart of road-surface rendering control according to the embodiment executed by a rendering controller in FIG. 2.

FIG. 5 is a flowchart of road-surface rendering control according to the first embodiment executed by the rendering controller 21 in FIG. 2.

The CPU 44 serving as a control unit of the rendering controller 21 repeatedly executes the road-surface rendering control in FIG. 5.

When a rendering control function is implemented in the headlamp controller 22 in the control system 20, the CPU of the headlamp controller 22 may serve as a control unit that repeatedly executes the road-surface rendering control in FIG. 5.

In step ST1, the CPU 44 that controls light projection for road-surface rendering determines whether road-surface rendering is to be performed. A request for road-surface rendering may be generated by each controller in the control system 20. For example, when the headlamp is to be turned on, the headlamp controller 22 may generate information for requesting road-surface rendering and output the information to the rendering controller 21 via the vehicle network 26. When there is a request for road-surface rendering, the CPU 44 causes the process to proceed to step ST2. When there is no request for road-surface rendering, the CPU 44 ends the control.

In step ST2, the CPU 44 selects a light projection pattern to be used for the road-surface rendering from the multiple light projection patterns 60 stored in the memory 41. The CPU 44 may select multiple light projection patterns or may select one light projection pattern.

In step ST3, the CPU 44 controls the light projection module 53 of the right headlamp module 31 and the light projection module 53 of the left headlamp module 32 to irradiate the road surface with light according to the selected light projection pattern. Accordingly, a road-surface rendered image 11 corresponding to the light projection pattern is rendered on the road surface.

In step ST4, the CPU 44 acquires a captured image 70 obtained by the vehicle-exterior camera 35. As illustrated in FIG. 4, the captured image 70 obtained by the vehicle-exterior camera 35 may be a captured image of the road surface on which the road-surface rendered image 11 output in step ST3 is rendered. In this case, the vehicle-exterior camera 35 serves as a detection device that detects a detection image.

In step ST5, the CPU 44 analyzes the acquired captured image 70 and extracts an image area of a detection image 73 in the captured image 70 as a light projection range. For example, the CPU 44 may extract, as a light projection range, an image area with a pattern that matches the selected light projection pattern. In the case of FIG. 4, the CPU 44 may extract an area with two detection images 73 as a light projection range. Moreover, the CPU 44 may extract a rectangular region surrounding the two detection images 73 as a light projection range.

In step ST6, the CPU 44 predicts a future location of the light projection range. For example, the CPU 44 may predict the future location of the light projection range when the vehicle 1 moves at the current vehicle speed for a predetermined time period.

The CPU 44 may predict the prediction range 77 in FIG. 4 as the future location of the light projection range.

As illustrated in FIG. 4, the prediction range 77 is located higher in the captured image 70 than the current light projection range extracted in step ST5. The prediction range 77 at least corresponds to an outer area of the road surface located in front of and outside the light projection range relative to the current light projection range.

In step ST7, the CPU 44 determines whether the predicted light projection range overlaps an insufficient reflection area (i.e., a deficiency area caused by an insufficient quantity of reflection light) included in the captured image 70.

An insufficient reflection area is, for example, an area of the image 75 of the puddle 4 on the road surface in FIG. 4. The puddle 4 on the road surface totally reflects light. As a result, the reflection light returning toward the driver who drives the vehicle 1 weakens.

As illustrated in FIG. 4, the CPU 44 splits the captured image 70 into multiple segments 76 and at least determines whether each segment 76 lacks reflection (i.e., has a deficiency area caused by an insufficient quantity of reflection light) toward the driver who drives the vehicle 1. Accordingly, the CPU 44 can identify, as an insufficient reflection segment, one segment 76 including the image 75 of the puddle 4 in the captured image 70 in FIG. 4.

Then, the CPU 44 determines whether the prediction range 77 in FIG. 4 serving as the future location of the light projection range overlaps the insufficient reflection segment 76. In FIG. 4, the prediction range 77 overlaps the insufficient reflection segment 76. In this case, the CPU 44 causes the process to proceed to step ST8.

In contrast, if the prediction range 77 does not overlap the insufficient reflection segment 76, the CPU 44 causes the process to proceed to step ST12.

From step ST8, the CPU 44 starts a process for suppressing the light projection toward the road surface when the road-surface rendered image 11 passes the road-surface area corresponding to the insufficient reflection segment. First, the CPU 44 determines whether the road-surface rendered image 11 starts to pass the road-surface area corresponding to the insufficient reflection segment. For example, the CPU 44 may set the timing at which the prediction range 77 starts to overlap the insufficient reflection segment 76 in step ST7 in the timer 42, and determine whether the road-surface rendered image 11 starts to pass the road-surface area corresponding to the insufficient reflection segment based on whether the timing is reached.

If the road-surface rendered image 11 does not start to pass the road-surface area corresponding to the insufficient reflection segment, the CPU 44 repeats the process. When the timing at which the road-surface rendered image 11 starts to pass the road-surface area corresponding to the insufficient reflection segment is reached, the CPU 44 causes the process to proceed to step ST9.

In step ST9, the CPU 44 stops the light projection for the road-surface rendered image 11 from the light projection members 53 so as to suppress the light projection for the road-surface rendered image 11 from the light projection members 53.

The CPU 44 may stop the light projection for the road-surface rendered image 11 not for the entire road-surface rendered image 11 but for the area thereof that overlaps the road-surface area corresponding to the insufficient reflection segment.

Furthermore, the CPU 44 may reduce the quantity of light projected for the road-surface rendered image 11 with respect to the area of the road-surface rendered image 11 that overlaps the road-surface area corresponding to the insufficient reflection segment.

In step ST10, the CPU 44 determines whether the road-surface rendered image 11 has completely passed the road-surface area corresponding to the insufficient reflection segment. For example, the CPU 44 may set the timing at which the prediction range 77 completely passes the insufficient reflection segment 76 in step ST7 in the timer 42, and determine whether the road-surface rendered image 11 has completely passed the road-surface area corresponding to the insufficient reflection segment based on whether the timing is reached.

If the road-surface rendered image 11 has not completely passed the road-surface area corresponding to the insufficient reflection segment, the CPU 44 repeats the process. When the timing at which the road-surface rendered image 11 completely passes the road-surface area corresponding to the insufficient reflection segment is reached, the CPU 44 causes the process to proceed to step ST11.

In step ST11, the CPU 44 resumes the light projection for the road-surface rendered image 11 from the light projection members 53 so as to end the suppression of the light projection for the road-surface rendered image 11 from the light projection members 53.

The CPU 44 may start the light projection for the road-surface rendered image 11 with the quantity of light for normal road-surface rendering with respect to the entire road-surface rendered image 11.

Accordingly, the CPU 44 can resume the light projection for the road-surface rendered image 11 from the light projection members 53 after the road-surface area corresponding to the insufficient reflection segment is passed.

By performing the process from step ST8 to step ST11, the CPU 44 can suppress the light projection for the road-surface rendered image 11 from the light projection members 53 when the road-surface rendered image 11 passes the road-surface area determined as being inadequate for road-surface rendering.

Subsequently, the CPU 44 causes the process to proceed to step ST12.

In step ST12, the CPU 44 determines whether the road-surface rendering is to be terminated. For example, the CPU 44 may determine that the road-surface rendering is to be terminated when, for example, there is no request for road-surface rendering. In this case, the CPU 44 ends the control.

For example, when there is a request remaining for road-surface rendering, the CPU 44 determines that the road-surface rendering is not to be terminated, and causes the process to return to step ST2. In this case, the CPU 44 repeats the process from step ST2 to step ST12 so as to continue with the road-surface rendering.

Accordingly, the CPU 44 predicts and determines whether the road-surface rendered image 11 passes a road-surface area with insufficient reflection based on the road-surface detection (i.e., the captured image) by the vehicle-exterior camera 35 serving as a detection device. The CPU 44 can then perform control to suppress the light projection for the road-surface rendering with respect to the road-surface area with insufficient reflection. Accordingly, this embodiment involves performing suppression such that the road-surface rendered image 11 that is difficult to visually recognize for the driver who drives the vehicle 1 using the road-surface rendering function is not rendered on the road surface. Furthermore, this embodiment involves suppressing in advance radiation of intense light onto, for example, the driver who drives the oncoming vehicle 2 due to rendering the road-surface rendered image 11 onto the road-surface area with insufficient reflection by usual intense light projection.

Figure 6:
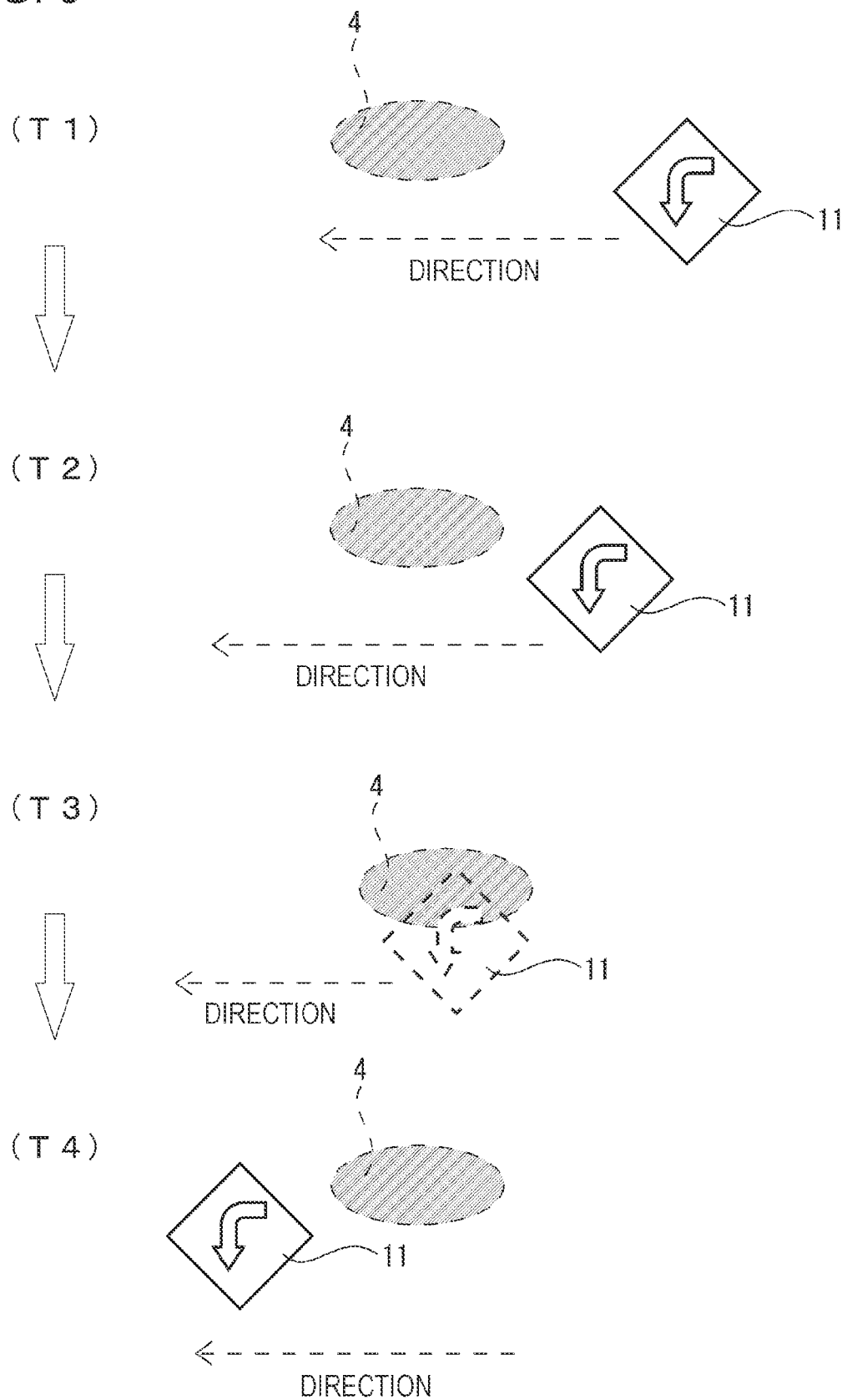
FIG. 6 illustrates a change in the road-surface rendering under the road-surface rendering control in FIG. 5.

FIG. 6 illustrates a change in the road-surface rendering under the road-surface rendering control in FIG. 5.

In FIG. 6, time elapses from a time point T1 toward a time point T4.

The vehicle 1 travels from right to left in the drawing. In this case, the road-surface rendered image 11 also moves from right to left in the drawing.

At each time point in FIG. 6, the puddle 4 where the quantity of reflected light is insufficient on the road surface is illustrated together with the road-surface rendered image 11.

At the time point T1, the puddle 4 exists in the traveling direction of the road-surface rendered image 11. In this case, the CPU 44 predicts and determines that the predicted light projection range in step ST7 in FIG. 5 overlaps the insufficient reflection segment 76 of the puddle 4 included in the captured image. The CPU 44 executes the process from step ST8 to step ST11.

At the time point T2, the road-surface rendered image 11 is located immediately before the puddle 4. The CPU 44 waits for the time point T2 in step ST8 and performs step ST9 to stop the light projection for the road-surface rendered image 11.

At the time point T3, the road-surface rendered image 11 overlaps the puddle 4. During this time, the CPU 44 waits for the road-surface rendered image 11 to pass the puddle 4 in step ST10 while the light projection for the road-surface rendered image 11 is stopped.

Subsequently, at the time point T4, the road-surface rendered image 11 has completely passed the puddle 4. The CPU 44 waits for the time point T4 in step ST10 and resumes the light projection for the road-surface rendered image 11 by performing step ST11.

Accordingly, the CPU 44 discontinues the road-surface rendering or performs light reduction during the period in which the road-surface rendered image 11 overlaps the puddle 4 on the road surface, and can resume the road-surface rendering after the road-surface rendered image 11 has passed the puddle 4.

Accordingly, in this embodiment, the vehicle-exterior camera 35 serving as a detection device can detect a detection range larger than a light projection range in which a road-surface rendered image is rendered by the light projection members 53. As compared with the light projection range in which light is actually projected by the light projection members 53, the detection range of the vehicle-exterior camera 35 is wide in the forward portion in the traveling direction of the vehicle 1 and allows for predictions.

The CPU 44 serving as a control unit that controls the light projection for the road-surface rendering by the light projection members 53 in accordance with the detection (i.e., the captured image 70) by the vehicle-exterior camera 35 uses the prediction range 77 to determine whether the road-surface rendering is adequate at least in the outer area of the road surface located in front of and outside the light projection range with respect to the detection range of the captured image 70. The CPU 44 splits the detection range of the captured image 70 into multiple segments 76 and at least determines whether each segment 76 lacks reflection (i.e., has a deficiency area caused by an insufficient quantity of reflection light) toward the driver who drives the vehicle 1, so as to determine whether the road-surface rendering is adequate.

The CPU 44 suppresses the light projection for the road-surface rendering from the light projection members 53 when the road-surface rendered image 11 passes the road-surface area determined as being an insufficient reflection segment and inadequate for road-surface rendering. The CPU 44 stops the light projection for the road-surface rendered image 11 from the light projection members 53 before the road-surface rendered image 11 passes the road-surface area corresponding to the insufficient reflection segment 76, and resumes the light projection for the road-surface rendered image 11 from the light projection members 53 after the road-surface rendered image 11 has passed the road-surface area corresponding to the insufficient reflection segment 76.

Accordingly, in this embodiment, when the road-surface rendered image 11 passes the road-surface area determined as being inadequate for road-surface rendering, the light projection for the road-surface rendered image 11 from the light projection members 53 can be suppressed. In this embodiment, the road-surface rendering can be suppressed in a road-surface area where it is difficult to obtain sufficient visibility. Moreover, in this embodiment, intense reflection is less likely to occur in the road-surface area, so that the driver who drives the oncoming vehicle 2 and the pedestrian 3 walking toward the vehicle 1 can expectedly be prevented from being irradiated with intense light via the road surface.

Second Embodiment

Next, a road-surface rendering device of the vehicle 1 according to a second embodiment of the disclosure will be described.

This embodiment relates to an example where the light projection may be controlled for each road-surface rendered image 11 when multiple road-surface rendered images 11 are to be rendered simultaneously on the road surface.

The following description mainly relates to differences from the above embodiment.

Figure 7:
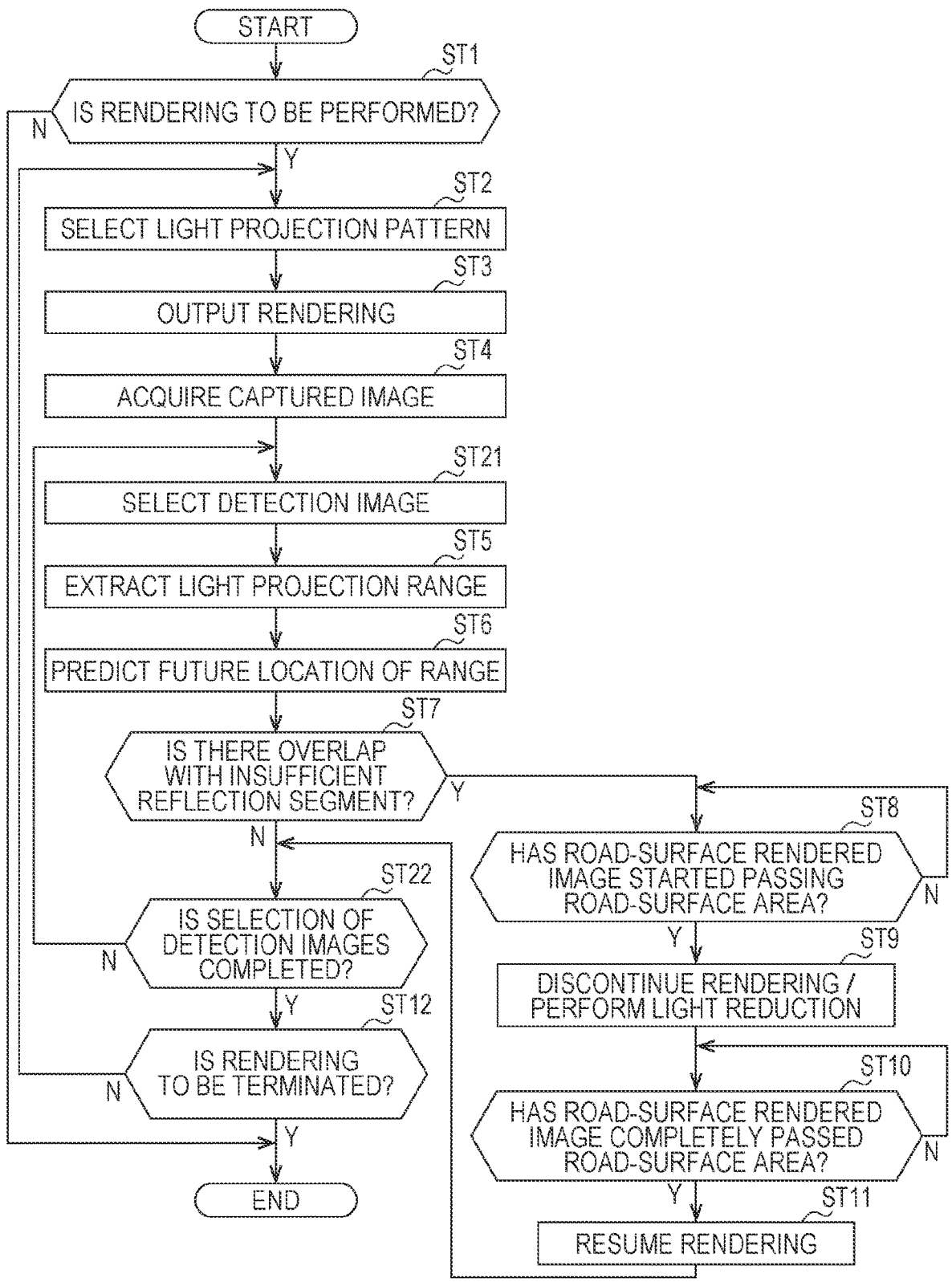
FIG. 7 is a flowchart of road-surface rendering control according to an embodiment executed by the rendering controller in FIG. 2.

FIG. 7 is a flowchart of road-surface rendering control according to the second embodiment executed by the rendering controller 21 in FIG. 2.

The CPU 44 serving as a control unit of the rendering controller 21 repeatedly executes the road-surface rendering control in FIG. 7.

When the rendering control function is implemented in the headlamp controller 22 in the control system 20, the CPU of the headlamp controller 22 may repeatedly execute the road-surface rendering control in FIG. 7.

Step ST1 to step ST4, step ST7 to step ST11, and step ST12 are similar to those in the above embodiment.

However, after step ST4, the CPU 44 causes the process to proceed to step ST21.

In step ST21, the CPU 44 selects one of multiple detection images 73 included in the captured image 70 in correspondence with the multiple road-surface rendered images 11. As illustrated in FIG. 1 and FIG. 3, the multiple road-surface rendered images 11 may be projected onto different areas of the road surface such that they do not basically overlap each other. In this case, the CPU 44 is capable of individually extracting the detection images 73 from the captured image 70. Subsequently, the CPU 44 causes the process to proceed to step ST5. In this case, the CPU 44 executes the process from step ST5 to step ST11. In the process from step ST5 to step ST11, the CPU 44 controls the light projection with respect to the road-surface rendered image 11 alone selected in step ST21. If it is determined in step ST7 that the prediction range 77 does not overlap the insufficient reflection segment 76, the CPU 44 causes the process to proceed to step ST22. After step ST11, the CPU 44 causes the process to proceed to step ST22.

In step ST22, the CPU 44 determines whether the selection of the detection images 73 from the captured image 70 is completed. If there is an unselected detection image 73 remaining in the captured image 70, the CPU 44 determines that the selection is not completed, and causes the process to return to step ST21. In this case, the CPU 44 selects the unselected detection image 73 in step ST21 and executes the process from step ST5 to step ST11. Then, when there is no unselected detection image 73 remaining in the captured image 70, the CPU 44 determines that the selection is completed, and causes the process to proceed to step ST12.

Accordingly, in this embodiment, the CPU 44 serving as a control unit can select multiple light projection patterns from the memory 41 serving as a storage medium that stores the multiple light projection patterns 60 for road-surface rendering, and can simultaneously output the light projection patterns. In this embodiment, rich information can be provided in accordance with the multiple road-surface rendered images 11.

In addition, instead of controlling the light projection while grouping the multiple simultaneously-output road-surface rendered images 11, this embodiment involves controlling the light projection by determining whether the road-surface rendered image 11 corresponding to each light projection pattern has passed the road-surface area determined as being inadequate for road-surface rendering. Accordingly, in this embodiment, the multiple road-surface rendered images 11 are rendered simultaneously so as to be rendered over a wide range of the road surface. Although it is conceivable that one or more of the multiple road-surface rendered images 11 tend to pass the road-surface area determined as being inadequate for road-surface rendering, the suppression of light projection can be controlled even in such a state. In this embodiment, with regard to the multiple simultaneously-rendered road-surface rendered images 11, the light projection can be controlled for each road-surface rendered image 11 that passes the road-surface area determined as being inadequate for road-surface rendering, and the remaining one or more road-surface rendered images 11 can be maintained.

Third Embodiment

Next, a road-surface rendering device of the vehicle 1 according to a third embodiment of the disclosure will be described.

The following description mainly relates to differences from the above embodiments.

This embodiment relates to an example where light projection is controlled for each road-surface rendered image 11 when multiple light projection patterns 60 are grouped in the memory 41 serving as a storage medium.

Among the multiple light projection patterns 60 in FIG. 1, the light projection pattern 61 for the left-turn indication, the light projection pattern 67 for the go-straight indication, and the light projection pattern 65 for the right-turn indication are grouped into one. The CPU 44 serving as a control unit utilizes this grouping of the light projection patterns 60 to control the light projection for each road-surface rendered image 11.

As illustrated in FIG. 1, the road-surface rendered image 11 of the left-turn-indication light projection pattern 61, the road-surface rendered image 11 of the go-straight-indication light projection pattern 67, and the road-surface rendered image 11 of the right-turn-indication light projection pattern 65 may be projected onto different locations on the road surface.

Even when, for example, the light projection is switched from the road-surface rendered image 11 for the left-turn indication to the road-surface rendered image 11 for the go-straight indication, the CPU 44 can utilize the grouping to reduce the occurrence of insufficient reflection of the road-surface rendered image 11 for the go-straight indication immediately after the switching.

Figure 8:
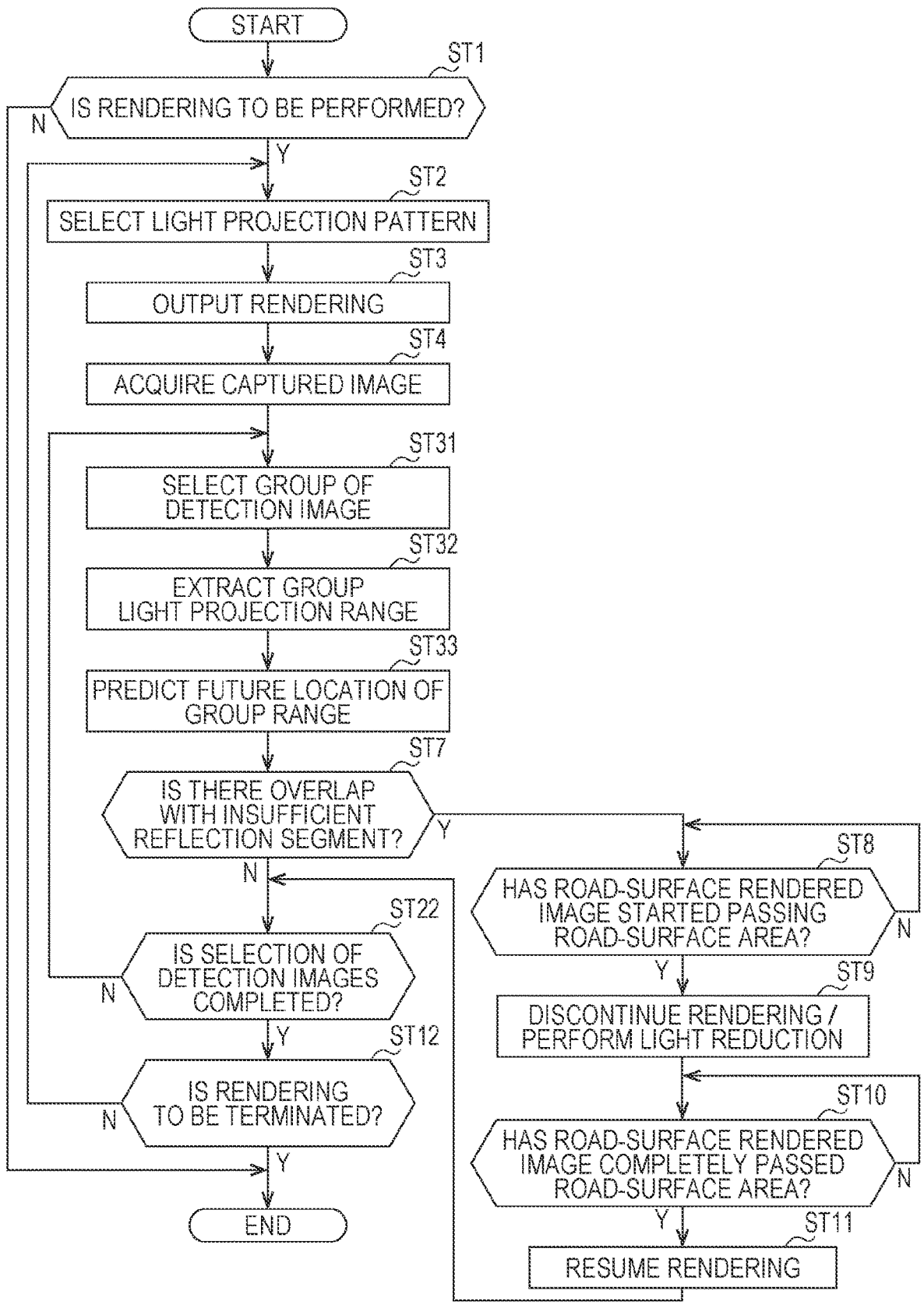
FIG. 8 is a flowchart of road-surface rendering control according to an embodiment executed by the rendering controller in FIG. 2.

FIG. 8 is a flowchart of road-surface rendering control according to the third embodiment executed by the rendering controller 21 in FIG. 2.

The CPU 44 serving as a control unit of the rendering controller 21 repeatedly executes the road-surface rendering control in FIG. 8.

When the rendering control function is implemented in the headlamp controller 22 in the control system 20, the CPU of the headlamp controller 22 may repeatedly execute the road-surface rendering control in FIG. 8.

Step ST1 to step ST4, step ST5 to step ST11, and step ST12 are similar to those in the above embodiments.

However, after step ST4, the CPU 44 causes the process to proceed to step ST31.

In step ST31, the CPU 44 selects one of multiple detection images 73 included in the captured image 70 in correspondence with the multiple road-surface rendered images 11. Furthermore, the CPU 44 selects the group of the selected detection image 73 from the memory 41. Accordingly, the CPU 44 selects the group of the detection image 73. In the multiple light projection patterns 60 in FIG. 1, light projection patterns other than the light projection pattern 61 for the left-turn indication, the light projection pattern 67 for the go-straight indication, and the light projection pattern 65 for the right-turn indication are not grouped. In this case, the CPU 44 may select a single light projection pattern corresponding to the detection image 73 as its group.

In step ST32, the CPU 44 extracts, from the captured image 70, a group light projection range for road-surface rendering according to one or more light projection patterns belonging to the selected group.

Accordingly, for example, when the road-surface rendered image 11 for the right-turn indication in FIG. 1 is being projected, the CPU 44 extracts, from the captured image 70, a group light projection range corresponding to the road-surface area including the three road-surface rendered images 11 in FIG. 1 as a group light projection range corresponding to the road-surface rendered image 11 for the right-turn indication.

In step ST33, the CPU 44 predicts a future location of the group light projection range. For example, the CPU 44 may predict the future location of the group light projection range when the vehicle 1 moves at the current vehicle speed for a predetermined time period.

Subsequently, the CPU 44 causes the process to proceed to step ST7. The CPU 44 determines whether the predicted group light projection range overlaps an insufficient reflection area (i.e., a deficiency area caused by an insufficient quantity of reflection light) included in the captured image 70. If the predicted group light projection range overlaps the insufficient reflection area, the CPU 44 performs the process from step ST8 to step ST11 on the selected detection image 73 to perform control for reducing the quantity of light during the passing.

Subsequently, the CPU 44 causes the process to proceed to step ST22. The CPU 44 executes control based on the group light projection range from step ST31 described above until the selection of the detection images 73 from the captured image 70 is completed. When there is no unselected detection image 73 remaining in the captured image 70, the CPU 44 determines that the selection is completed, and causes the process to proceed to step ST12.

Accordingly, in this embodiment, the memory 41 serving as a storage medium stores one or more of the multiple light projection patterns 60 in association with each other by grouping. If the light projection pattern corresponding to the detection image 73 selected from the captured image 70 is associated with another light projection pattern by grouping in the memory 41, the CPU 44 serving as a control unit sets the range of the multiple road-surface rendered images 11 corresponding to the multiple light projection patterns as a group light projection range, predicts a future location of the entire group light projection range, and determines an overlap with an insufficient reflection area on the road surface. If the entire group light projection range passes a road-surface area determined as being inadequate for road-surface rendering, the CPU 44 can perform control to suppress the light projection until the entire group light projection range passes the aforementioned road-surface area.

Accordingly, in this embodiment, when the light projection pattern selected from the multiple light projection patterns associated with each other by grouping is to be projected, it is determined whether all of the multiple road-surface rendered images (group light projection range) corresponding to the multiple associated light projection patterns have passed the road-surface area determined as being inadequate for road-surface rendering, so that control can be performed to not perform the light projection. Consequently, in this embodiment, with regard to the multiple light projection patterns stored in association with each other by grouping, when any of the road-surface rendered images 11 is to pass the road-surface area determined as being inadequate for road-surface rendering, all of the multiple light projection patterns are not to be projected. If the road-surface rendered image 11 is switched after the passing, the road-surface rendered image 11 may be projected in a state where it has passed the road-surface area with the insufficient quantity of light.

Although the above embodiments are examples of preferred embodiments of the disclosure, the embodiments of the disclosure are not limited thereto and permit various modifications and alterations so long as they do not depart from the scope of the embodiments of the disclosure.

In the above embodiments, each light projection module 53 serving as a light projection member is provided in the vehicle 1 integrally with the headlamp LEDs 51 and 52 in the right headlamp module 31 or the left headlamp module 32.

Alternatively, for example, each light projection module 53 serving as a light projection member may be provided in the vehicle 1 separately from the right headlamp module 31 or the left headlamp module 32.

Furthermore, the vehicle 1 may be provided with a single light projection module 53 or three or more light projection modules 53. The single light projection module 53 or the third light projection module 53 may be provided at the widthwise center of the front surface of the vehicle 1.

In the embodiments of the disclosure, the detection device is capable of detecting a detection range larger than the light projection range in which the road-surface rendered image is rendered by the light projection members.

The control unit that controls the light projection for road-surface rendering from the light projection members in accordance with the detection by the detection device determines whether the road-surface rendering is adequate at least in the outer area of the road surface located outside the light projection range with respect to the detection range of the detection device. When the road-surface rendered image passes the road-surface area determined as being inadequate for road-surface rendering, the control unit suppresses the light projection for road-surface rendering from the light projection members.

Accordingly, in the embodiments of the disclosure, when the road-surface rendered image passes the road-surface area determined as being inadequate for road-surface rendering, the light projection for the road-surface rendered image from the light projection members can be suppressed. In the embodiments of the disclosure, road-surface rendering in a road-surface area where sufficient visibility is not obtainable can be suppressed. Moreover, in the embodiments of the disclosure, intense reflection is less likely to occur in the road-surface area, so that the driver who drives the oncoming vehicle and the pedestrian walking toward the vehicle can expectedly be prevented from being irradiated with intense light via the road surface.

In the embodiments of the disclosure, the light projection for road-surface rendering can be controlled, so that an improvement in the road-surface rendering from the vehicle can be expected.

The control system 20 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the rendering controller 21, the headlamp controller 22, the operation controller 23, the detection controller 24, the communication controller 25, and the vehicle network 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle having a road-surface rendering function, the vehicle comprising:
   a light projection member configured to perform light projection for road-surface rendering in the vehicle that is traveling, the light projection member being configured to render a road-surface rendered image onto a road surface surrounding the vehicle that is traveling;
   a detection device configured to perform detection of a detection range larger than a light projection range in which the road-surface rendered image is rendered by the light projection member; and
   a control unit configured to control the light projection for the road-surface rendering by the light projection member in accordance with the detection by the detection device,
   wherein the control unit is configured to
      determine whether the road-surface rendering is adequate at least in an outer area of the road surface located outside the light projection range with respect the detection range of the detection device, and
      suppress the light projection for the road-surface rendered image from the light projection member when the road-surface rendered image passes a road-surface area determined as being inadequate for the road-surface rendering.

2. The vehicle having the road-surface rendering function according to claim 1,
   wherein the detection range of the detection device is wide at least in a forward portion in a traveling direction of the vehicle, as compared with the light projection range of the light projection member.

3. The vehicle having the road-surface rendering function according to claim 2,
   wherein the control unit is configured to
      split the detection range of the detection device into segments,
      at least determine whether reflection toward a driver who drives the vehicle is insufficient for each of the segments, and
      suppress the light projection for the road-surface rendered image from the light projection member when the road-surface rendered image passes a road-surface area corresponding to, among the segments, a segment where the reflection is insufficient.

4. The vehicle having the road-surface rendering function according to claim 3,
   wherein the control unit is configured to
      stop the light projection for the road-surface rendered image from the light projection member before the road-surface rendered image passes the road-surface area corresponding to the segment where the reflection is insufficient, and
      resume the light projection for the road-surface rendered image from the light projection member after the road-surface rendered image passes the road-surface area corresponding to the segment where the reflection is insufficient.

5. The vehicle having the road-surface rendering function according to claim 4, further comprising:
   a storage medium configured to store light projection patterns to be projected by the light projection member,
   wherein the control unit is configured to
      when the light projection patterns are to be output simultaneously from the detection device, control the light projection by determining whether the road-surface rendered image corresponding to each of the light projection patterns has passed the road-surface area determined as being inadequate for the road-surface rendering.

6. The vehicle having the road-surface rendering function according to claim 5,
   wherein one or more of the light projection patterns are stored in the storage medium with being in association with each other, and
   wherein the control unit is configured to
      determine, when a light projection pattern selected from the multiple light projection patterns associated with each other is to be projected from the light projection member, whether all of road-surface rendered images respectively corresponding to the light projection patterns associated with each other have passed the road-surface area determined as being inadequate for the road-surface rendering,
      and perform control so as not to perform the light projection.

7. The vehicle having the road-surface rendering function according to claim 3, further comprising:
   a storage medium configured to store light projection patterns to be projected by the light projection member, wherein the control unit is configured to
when the light projection patterns are to be output simultaneously from the detection device, control the light projection by determining whether the road-surface rendered image corresponding to each of the light projection patterns has passed the road-surface area determined as being inadequate for the road-surface rendering.

8. The vehicle having the road-surface rendering function according to claim 7,
wherein one or more of the light projection patterns are stored in the storage medium with being in association with each other, and
wherein the control unit is configured to
determine, when a light projection pattern selected from the multiple light projection patterns associated with each other is to be projected from the light projection member, whether all of road-surface rendered images respectively corresponding to the light projection patterns associated with each other have passed the road-surface area determined as being inadequate for the road-surface rendering,
and perform control so as not to perform the light projection.

9. The vehicle having the road-surface rendering function according to claim 2, further comprising:
a storage medium configured to store light projection patterns to be projected by the light projection member,
wherein the control unit is configured to
when the light projection patterns are to be output simultaneously from the detection device, control the light projection by determining whether the road-surface rendered image corresponding to each of the light projection patterns has passed the road-surface area determined as being inadequate for the road-surface rendering.

10. The vehicle having the road-surface rendering function according to claim 9,
wherein one or more of the light projection patterns are stored in the storage medium with being in association with each other, and
wherein the control unit is configured to
determine, when a light projection pattern selected from the multiple light projection patterns associated with each other is to be projected from the light projection member, whether all of road-surface rendered images respectively corresponding to the light projection patterns associated with each other have passed the road-surface area determined as being inadequate for the road-surface rendering,
and perform control so as not to perform the light projection.

11. The vehicle having the road-surface rendering function according to claim 1, further comprising:
a storage medium configured to store light projection patterns to be projected by the light projection member,
wherein the control unit is configured to
when the light projection patterns are to be output simultaneously from the detection device, control the light projection by determining whether the road-surface rendered image corresponding to each of the light projection patterns has passed the road-surface area determined as being inadequate for the road-surface rendering.

12. The vehicle having the road-surface rendering function according to claim 11,
wherein one or more of the light projection patterns are stored in the storage medium with being in association with each other, and
wherein the control unit is configured to
determine, when a light projection pattern selected from the multiple light projection patterns associated with each other is to be projected from the light projection member, whether all of road-surface rendered images respectively corresponding to the light projection patterns associated with each other have passed the road-surface area determined as being inadequate for the road-surface rendering,
and perform control so as not to perform the light projection.

13. A vehicle having a road-surface rendering function, the vehicle comprising:
a light projection member including a light source and configured to perform light projection for road-surface rendering in the vehicle that is traveling, the light projection member being configured to render a road-surface rendered image onto a road surface surrounding the vehicle that is traveling; and
circuitry configured to
perform detection of a detection range larger than a light projection range in which the road-surface rendered image is rendered by the light projection member,
control the light projection for the road-surface rendering by the light projection member in accordance with the detection,
determine whether the road-surface rendering is adequate at least in an outer area of the road surface located outside the light projection range with respect the detection range, and
suppress the light projection for the road-surface rendered image from the light projection member when the road-surface rendered image passes a road-surface area determined as being inadequate for the road-surface rendering.

* * * * *